Dec. 23, 1958     E. J. RUHNKE     2,866,071
HEATING APPLIANCE CONSTRUCTION
Filed June 6, 1958
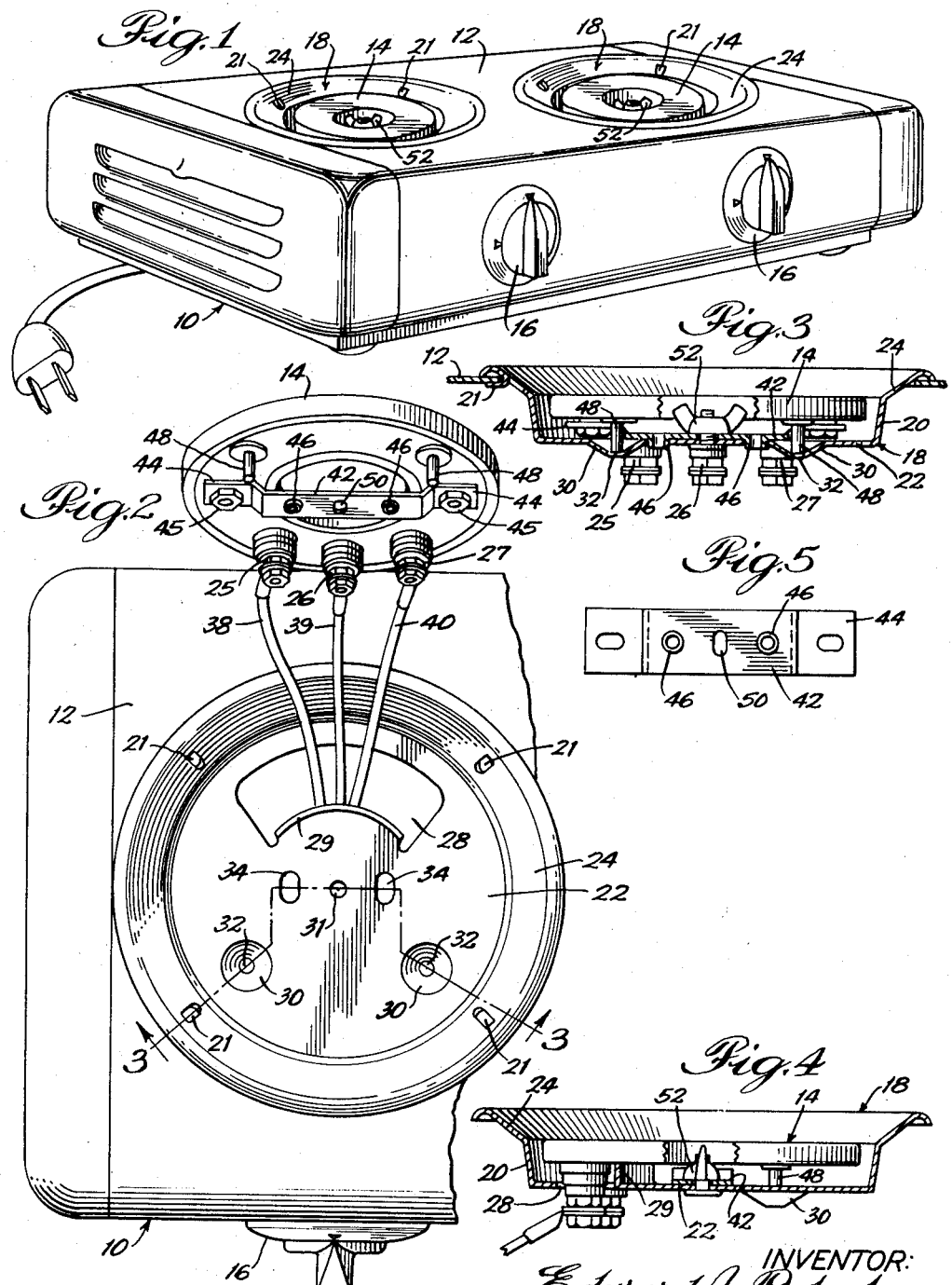
INVENTOR:
Edward J. Ruhnke,
BY Bair, Freeman & Molinare
ATTORNEYS.

United States Patent Office 2,866,071
Patented Dec. 23, 1958

2,866,071

HEATING APPLIANCE CONSTRUCTION

Edward J. Ruhnke, Chicago, Ill., assignor to Hill-Shaw Company, Chicago, Ill., a corporation of Illinois Application June 6, 1958, Serial No. 740,246

5 Claims. (Cl. 219—37)

This invention relates to an improvement in electric appliances such as hot plates, stoves and the like having an electrical heating ring within a cup disposed in the top panel of the appliance housing. More particularly, it relates to a simplified means for detachably securing the heating element to the cup or well in which it is located.

In hot plates of this type made heretofore the heating element is secured to the cup and is removable from the cabinet or housing only as an integral assembly with the cup. The removal operation is cumbersome and usually requires tools. Hot plates of this type are frequently used in restaurants for making and heating coffee. They are in operation continuously, and as a result it is necessary to replace the heating elements relatively frequently. Furthermore, it is desirable to be able to remove the heating element to clean the cup or well in which it is disposed.

It is, therefore, a primary object of this invention to provide an improved hot plate construction wherein the heating element may be quickly removed from the cup or well without the use of tools by any unskilled person.

It is a further objective to provide a construction of this type in which the heating element is automatically located with respect to the cup when it is placed in the cup.

In a preferred form of the invention a bracket is provided extending diametrically across the annular heating element to support the element above the plane of the bottom of the cup. An opening through the bracket cooperates with a stud projecting from the bottom of the cup for detachably securing the heating element to the cup. Complementary locating elements are provided on the underside of the heating element and in the surface of the cup to center and to orient the element with respect to the cup so that the conductors connecting to the heating element pass through an opening provided therefor in the cup without contacting the metal edge surrounding the opening. Obviously, it is desirable to insulate the conductors spatially from the housing as well as by the conventional insulating cover.

Another object is to provide integral with the bracket supplementary means which cooperates with the cup bottom to further assure accurate location of the heating element.

These and other objects will become apparent from the following description when read in conjunction with the accompanying drawing, wherein:

Figure 1 is a perspective view of a two-element hot plate constructed in accordance with the invention;

Figure 2 is a plan view of one side of the hot plate showing the heating element removed from the cup in which it is normally positioned;

Figure 3 is a sectional view taken along the line 3—3 of Figure 2;

Figure 4 is a sectional view similar to Figure 3 wherein the element and cup are oriented 90° from the position of Figure 3; and Figure 5 is a plan view of the bracket utilized for securing the heating element to the cup.

Referring to Figure 1, the hot plate is designated generally by the numeral 10 and consists of a metal housing preferably made from stainless steel having a top panel 12 adapted to hold the heating elements 14. The switches 16, one for each of the elements, are provided to put more or less resistance into the circuit to increase or decrease the amount of heat given off by the ring-like heating element 14. Although a two-element appliance is used to illustrate the invention, it will be apparent that there is no restriction as to the number of elements employed. The element 14 is of standard construction and consists of one or more high resistance insulated conductors housed in a flat, ring-like member. The annular heating element 14 is adapted to fit in the cup or well 18 which in turn is mounted in an opening cut through the top panel 12 of the hot plate housing. As shown in Figure 3, an upper flange 24 rests on the top surface of the margin of panel 12 surrounding the opening and deflected ears or tongues 21 cut out of the flange 24 at points about the circumference embrace the underside of the panel to fix the cup 18 securely within the opening. The cup has a flat bottom 22 and slightly inclined side walls 20 which connect with the outwardly flaring flange 24. Projecting upwardly from the flat bottom of the cup directly in the center thereof is a threaded stud 31 to which the heating element 14 is secured.

An arcuate opening 28 for receiving conductors 38, 39 and 40 and connecting posts or terminals 25, 26, 27 is provided on one side of the stud 31. The longer side walls of the opening 28 are concentric with the heating element and the cup. The shorter walls are radii from the center stud 31. Sufficient clearance is provided by the opening so that the conductors and terminals are completely spaced from the edge of the opening. An upright flange 29 lying on the inner curved edge of the opening 28 serves to support one side of the element 14 when it is positioned within the cup.

On the other side of the stud 31 I have provided a pair of locating depressions 30 which are radially spaced from the stud. The locating depressions have downwardly sloping side walls which terminate in a flat bottom portion 32. Another pair of locating slots 34 are positioned one on either side of the stud 31 between the opening 28 and the locating depressions 30. These slots and the depressions 30 cooperate with projections on the annular element as described hereinafter.

In addition to the terminals to which the conductors connect a pair of pins 48 project from the underside of the heating element 14. These pins are integral with the heating element and seat on the bottoms 32 of the locating depressions 30 in the bottom 22 of the cup. They support the front of the heating element 14. It will be noted that because of the sloping side walls of the locating depressions the element 14 may be mislocated slightly in any direction when placed in the cup; but the pins 48 slide down the sides of the depressions and seat on the bottoms 32 automatically to orient the element. The pins and the aligned cooperating locating depressions are so positioned that the terminals 25, 26, 27 projecting from the underside of the heating element will be centered within the opening 28.

The bracket 42 extends diametrically across the annular heating element 14 and terminates in offset foot portions 44 parallel with the central portion 42. The terminal feet 44 may be secured to the underside of the heating element 14 by means of nuts 45 or they may be spot welded or fixed thereto in any other convenient manner. An elongated opening 50 is provided in the center of the bracket and is adapted to be aligned with the stud 31 projecting from the cup bottom. By providing an elongated opening rather than a round opening the annular element is easier to locate on the stud 31. It will automatically center upon the seating of pins 48 in the locating depressions 30.

A pair of projections 46, one on either side of the opening 50, extend downwardly from the bottom of the bracket and are adapted to cooperate with complementary slots 34 cut through the bottom of the cup. Projections 46 may be made by deforming the metal of the bracket 42. The slots 34 are elongated to facilitate locating the annular heating element in the cup. A wing nut 52 screws onto the end of the stud 26 to hold the bracket 42 and the annular heating element 14 to the bottom of the cup. It will be understood, however, that other suitable manually operable fasteners may be used instead of the wing nut.

From the foregoing description it will appear that the heating element may be simply removed by unscrewing the wing nut 52. The element 14 may then be lifted from the cup without any further manipulation of fastening elements. Furthermore, this operation can be carried out without using any tools. The nut is easily removable with the fingers. In replacing the heating element after the cup has been cleaned or after a new element has been secured to the conductors, the terminals 25, 26, 27 are first pushed through the opening 28 by tilting the element so that its front edge is elevated above the rear edge. The front edge is then pushed downwardly and the supporting pins 48 automatically seat in the locating depressions 30. Simultaneously the bracket 42 and projections 46 seat on the bottom of the cup and the underside of the heating element 14 rests on the top edge of the upright flange 29. Hence, the element is supported on all sides above the bottom of the cup and is properly oriented with respect to the opening 28. When the wing nut 52 is screwed onto the stud, the heating element becomes securely fixed to the bottom of the cup.

Various other modifications of the invention will occur to those skilled in the art. It is not my intention to limit the invention to the forms illustrated other than as necessitated by the scope of the appended claims.

What I claim as new and desire to secure by Letters Patent of the United States is:

1. A heating unit for appliances comprising a cup member having a flat bottom disposed in the top panel of the appliance, a stud projecting from the center of said bottom, an arcuate slot through said bottom on one side of said stud, a pair of locating depressions in said bottom on the other side of said stud and a generally flat annular heating element disposed within said cup, a plurality of terminals extending from the underside of said element through said arcuate slot, a pair of locating and supporting pins projecting from the underside of said element into said locating depressions, a bracket extending across said heating element and spaced from the underside thereof having an opening therethrough aligned with said stud and a fastener cooperating with said stud for detachably securing said bracket and said heating element attached thereto to the bottom of said cup.

2. The heating unit of claim 1 in which said bracket has a locating element on either side of said opening which cooperates with a complementary locating element in the bottom of said cup to assist said pins in assuring accurate orientation of said heating element within said cup.

3. The heating element of claim 1 in which said bracket has a pair of male locating elements, one on either side of said opening, which cooperate with female elements located in the bottom of said cup to assist said pins in assuring accurate orientation of said heating element within said cup.

4. An electrical heating unit comprising a cup member having a central threaded stud projecting from the bottom thereof, an arcuate slot on one side of said stud and a pair of spaced depressions on the other side of said stud, an upwardly turned supporting flange along one edge of said arcuate slot, an annular heating element disposed within said cup and having a plurality of terminals extending downwardly through said arcuate slot, a pair of pins disposed within said depressions for supporting and locating said element and a diametrically extending bracket containing an opening aligned with said central stud and a nut cooperating with said stud for securing said bracket and the heating element attached thereto to the bottom of the cup.

5. An electrical heating unit comprising a cup member having a flat bottom and a central stud projecting from said bottom, an arcuate slot in said bottom along one side of said cup, a pair of spaced depressions in said bottom opposite said arcuate slot, said depressions having side walls which slope inwardly toward their base, an annular heating element disposed within said cup, an upwardly extending flange along one edge of said arcuate slot for supporting said element on one side, a pair of pins extending downwardly from said heating element into said depressions for locating and supporting said element on the other side, a plurality of terminals extending downwardly from said heating element into said arcuate slot, a bracket extending across the diameter of said heating element and spaced from the underside thereof, an opening in said bracket aligned with said central stud, and a fastener cooperating with said stud for detachably securing said bracket and said heating element attached thereto to the bottom of said cup.

References Cited in the file of this patent

UNITED STATES PATENTS

| | | |
|---|---|---|
| 2,176,382 | Smith | Oct. 17, 1939 |
| 2,580,698 | Perlman | Jan. 1, 1952 |